United States Patent
Haka

(10) Patent No.: US 7,062,984 B2
(45) Date of Patent: Jun. 20, 2006

(54) VEHICLE POWERTRAIN WITH TWO-WHEEL AND FOUR-WHEEL DRIVE RATIOS

(75) Inventor: Raymond J. Haka, Brighton, MI (US)

(73) Assignee: General Motors Corporation, Detroit, MI (US)

( * ) Notice: Subject to any disclaimer, the term of this patent is extended or adjusted under 35 U.S.C. 154(b) by 99 days.

(21) Appl. No.: 10/851,045

(22) Filed: May 21, 2004

(65) Prior Publication Data

US 2005/0261100 A1  Nov. 24, 2005

(51) Int. Cl.
*F16H 3/44* (2006.01)

(52) U.S. Cl. .......................... 74/21; 495/295; 495/303; 495/311; 495/314; 495/210; 180/233; 180/247

(58) Field of Classification Search ............... 74/21; 475/311, 314, 210, 303, 295; 180/233–251; F16H 48/04
See application file for complete search history.

(56) References Cited

U.S. PATENT DOCUMENTS

| | | | |
|---|---|---|---|
| 5,411,447 A * | 5/1995 | Frost | 475/223 |
| 6,612,959 B1 * | 9/2003 | Frost | 475/288 |
| 6,942,592 B1 * | 9/2005 | Haka | 475/311 |
| 2002/0142877 A1 * | 10/2002 | Williams et al. | 475/198 |
| 2003/0216209 A1 * | 11/2003 | Gradu | 475/151 |
| 2004/0180749 A1 * | 9/2004 | Haka | 475/210 |
| 2004/0180752 A1 * | 9/2004 | Haka | 475/303 |
| 2004/0198548 A1 * | 10/2004 | Showalter et al. | 475/303 |

* cited by examiner

*Primary Examiner*—Charles A. Marmor
*Assistant Examiner*—Justin K. Holmes
(74) *Attorney, Agent, or Firm*—Christopher DeVries

(57) ABSTRACT

A vehicle powertrain incorporates a planetary gearset which is coupled with a front wheel drive mechanism and a rear wheel drive mechanism. The planetary gearset is controlled by two torque-transmitting mechanisms to establish an input member of the planetary gearset as well as a grounded member for the planetary gearset in combinations that will provide a two-wheel low drive ratio, a two-wheel high drive ratio, a four-wheel low drive ratio, and a four-wheel high drive ratio.

6 Claims, 2 Drawing Sheets

VEHICLE POWERTRAIN WITH TWO-WHEEL AND FOUR-WHEEL DRIVE RATIOS

TECHNICAL FIELD

This invention relates to vehicle powertrains and, more particularly, to vehicle powertrains having a transfer case providing both a two-wheel drive and a four-wheel drive.

BACKGROUND OF THE INVENTION

Typically, automotive transfer cases provide a two-speed planetary arrangement. One of the arrangements provides a high range RWD drive, the other provides a high range four-wheel drive and also provides a low range four-wheel drive. While this is very effective is passenger vehicles, it can be improved when employed in truck applications, such as pick-up trucks. When a pick-up truck is operated unloaded, the majority of the vehicle weight is on the front axle. However, when the pick-up truck is loaded, the majority of the vehicle weight is on the rear axle.

SUMMARY OF THE INVENTION

It is an object of the present invention to provide an improved vehicle powertrain having a transfer case to establish both two-wheel and four-wheel drive ratios between a transmission output and the drive axles of the vehicle.

In one aspect of the present invention, the transfer case is provided with two torque-transmitting mechanisms, a planetary gear arrangement or gearset, and a drive transfer mechanism.

In another aspect of the present invention, one of the torque-transmitting mechanisms is effective to connect individually two members of the planetary gearset with the transmission output member, the other torque-transmitting mechanism is effective to connect a third member of the planetary gearset with a stationary housing.

In yet another aspect of the present invention, the powertrain has a rear axle ratio determined by a final drive mechanism and the front axle has a final drive ratio determined by both a drive mechanism and the drive transfer mechanism.

In still another aspect of the present invention, the ratio of the planetary gearset is combined with the final drive ratios of the front and rear wheels to provide a rear-wheel drive low ratio, a front-wheel drive high ratio, a four-wheel drive low ratio, and a four-wheel drive high ratio.

In a further aspect of the present invention, the first of the torque-transmitting mechanisms is engaged to establish the front-wheel drive ratio and is engaged in combination with the second torque-transmitting mechanism to provide the high four-wheel drive ratio.

In yet a further aspect of the present invention, the front drive final drive ratio is lower numerically than the rear drive final drive ratio.

In a still further aspect of the present invention, the torque-transmitting mechanisms include a mechanical clutch, which connects the transmission output with the front axle to provide two-wheel drive high ratio and connects with the rear axle to provide two-wheel drive low ratio.

In yet still a further aspect of the present invention, the mechanical clutch is engaged in combinations with the other torque-transmitting mechanism, which is a brake mechanism to provide a four-wheel drive high ratio and a four-wheel drive low ratio.

In a yet still further aspect of the present invention, the ring to sun ratio of the planetary gearset is selected to have a ring and carrier speed ratio, which will match with the rear and front axle ratios when the sun gear is held stationary.

DESCRIPTION OF AN EXEMPLARY EMBODIMENT

Figure 1:
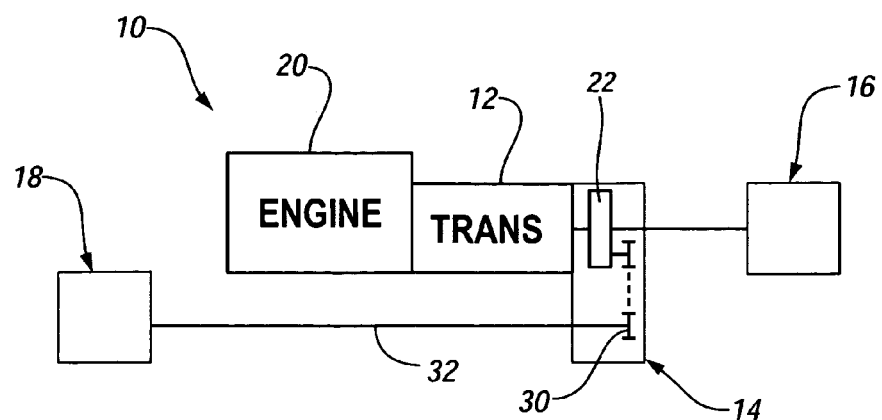
FIG. 1 is a diagrammatic representation of a vehicle powertrain incorporating the present invention.

Referring to the drawings, wherein like characters represent the same or corresponding parts throughout the several views, there is seen in FIG. 1 a vehicle powertrain, generally designated 10, having a conventional power transmission 12, a transfer case 14, a rear final drive ratio or mechanism 16, and a front final drive ratio or mechanism 18. The transmission 12, being a conventional mechanism, provides a plurality of speed ratios between an engine 20 and a transmission output shaft 22.

Figure 2:
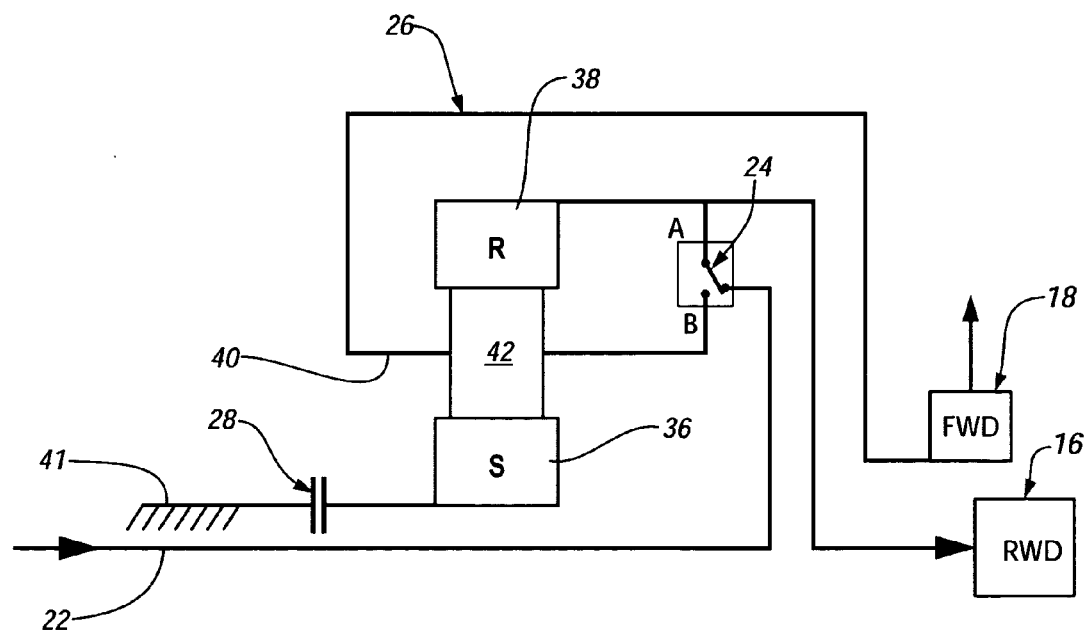
FIG. 2 is a schematic representation of a planetary gearset incorporated within the powertrain of FIG. 1.

The transmission output shaft 22, as best seen in FIG. 2, is drivingly connected with a torque-transmitting mechanism or mechanical clutch 24, which has an A position and a B position of operation. The transfer case 14 includes the torque-transmitting mechanism 24 as well as a planetary gearset 26 and another torque-transmitting mechanism 28. The transfer case 14 also includes a transfer drive 30, such as a chain or gear train. The transfer drive 30 is connected with a propeller shaft or drive shaft 32, which connects with the front final drive mechanism 18. The planetary gearset 26 also has an output shaft 34, which drivingly connects with the rear final drive mechanism 16.

The planetary gearset 26 includes a sun gear member 36, a ring gear member 38, and a planet carrier member 40. A plurality of pinion gears 42 are rotatably mounted on the planet carrier member 40 and disposed in meshing relationship with the sun gear member 36 and the ring gear member 38. The planetary gearset 26 is shown as a simple planetary gearset, that is a single set of pinions between the sun gear member and the ring gear member. However, a number of planetary gearsets can be employed in this invention including compound-type planetary gearsets wherein pairs of meshing pinion gears are disposed between the ring gear member and sun gear member. These various planetary gearsets will be well known to those skilled in the art such that it is not considered necessary to show and describe each of the planetary gearsets, which might be employed.

The torque-transmitting mechanism 24 is selectable between the A position and the B position. In the A position, the transmission output shaft 22 is connected directly with the ring gear member 38. In the B position, the transmission output shaft 22 is connected with the planet carrier member 40. The torque-transmitting mechanism 28 is a brake mechanism connected between a stationary portion 41 and the sun gear member 36. When the torque-transmitting mechanism 28 is engaged, the sun gear member 36 is held stationary.

The transfer drive means 30 and the ring gear to pinion gear ratio of the front drive mechanism 18 cooperate to provide the overall front drive ratio. The rear drive mechanism 16 has a ratio established by a conventional ring and pinion gearset as well as a differential gearset to drive the output wheels.

Figure 3:
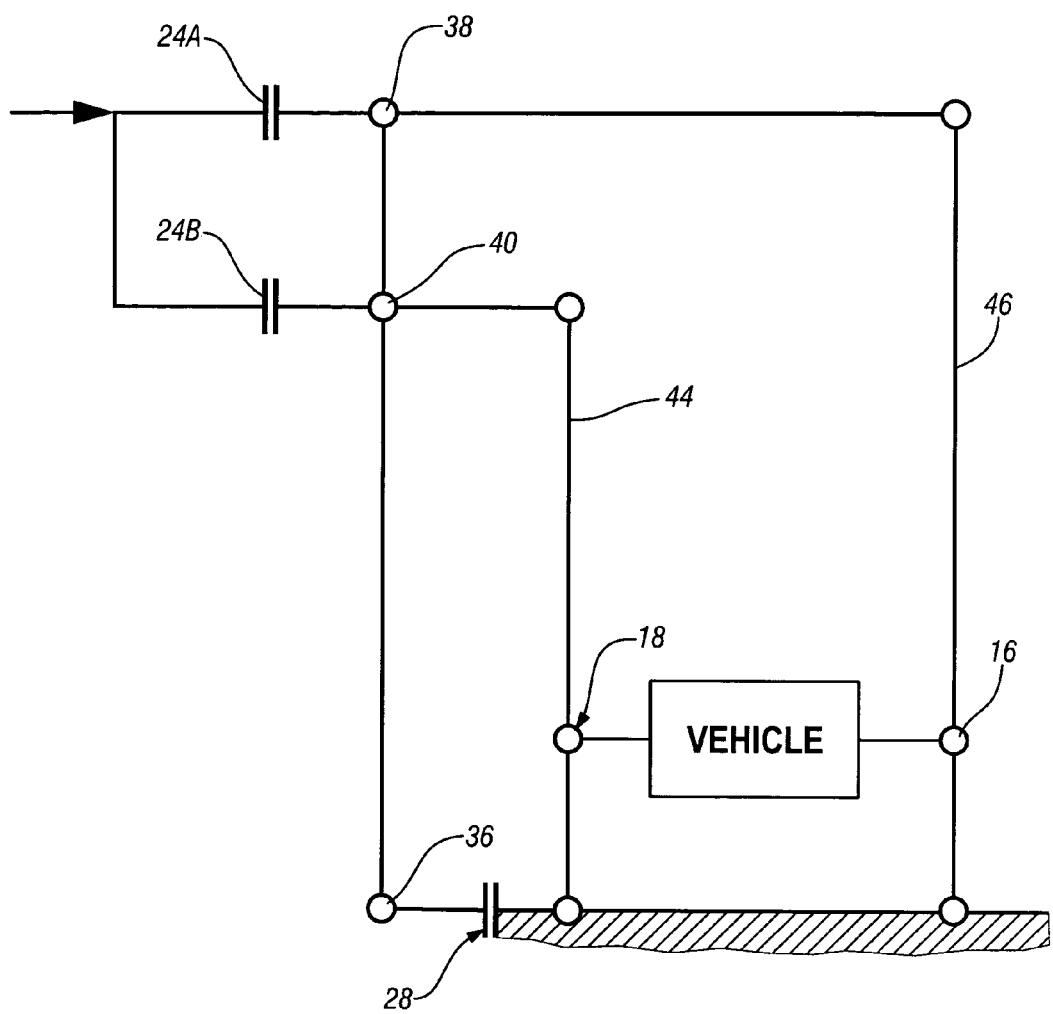
FIG. 3 is a lever diagram of the vehicle powertrain.

The lever diagram shown in FIG. 3 has been given the same numerical designations as the corresponding components in FIG. 2. In the lever diagram of FIG. 3, the sun gear node is 36, the planet carrier node is 40, and the ring gear node is 38. The positions of the torque-transmitting mechanism 24 are shown as 24A and 24B. The final drive ratio of the front final drive 18 is represented by a lever 44 and the final drive ratio of the rear final drive 16 is represented by a lever 46.

The mechanism shown and described provides four distinct drive conditions. This same mechanism will provide a rear-wheel drive Lo, a front-wheel drive Hi, a four-wheel high ratio, and a four-wheel low ratio. These ratios might be employed during operating conditions for the vehicle. For example, in a pick-up truck that is unloaded on a high friction surface, a four-wheel drive is not required and the majority of the vehicle weight is on the front wheels therefore a two-wheel front wheel drive is provided. This is a high ratio drive compared to other drives within the system.

When the pick-up truck is loaded, it is desirable to drive on the rear wheels and since there is considerably more weight on the rear wheels, the drive ratio is a lower ratio, thereby producing higher tractive effort to the ground. When the traction surface has a low coefficient of friction, it is desirable to provide four-wheel drive ratios such that when the vehicle is totally loaded, the four-wheel drive ratio is a low ratio and when the vehicle is unloaded the drive ratio is a four-wheel drive high ratio. These ratios are accomplished by combinations of engagement of the torque-transmitting mechanisms 24 and 28.

To provide a rear-wheel drive low ratio, the torque-transmitting mechanism 24 is placed in the position 24A and the torque-transmitting mechanism 28 is disengaged. Under this arrangement, the drive is directly from the transmission output shaft 22 to the rear-wheel drive 16 through the output drive shaft 34, which connects directly with the ring gear member 38.

To provide a two-wheel drive high ratio, the torque-transmitting mechanism 24 is placed in the position 24B such that the drive from the transmission 12 is directed to the planet carrier member 40. The planet carrier member 40 is connected directly with the front-wheel final drive 18 and has a lower numerical ratio than the rear-wheel final drive ratio.

The four-wheel drive low ratio is provided by placing the torque-transmitting mechanism 24 in the A position and by engaging the torque-transmitting mechanism 28. This establishes the sun gear member 36 as a ground member within the system such that the input power from the transmission 12 through shaft 22 is split between the ring gear member 38 and the planet carrier member 40 at a ratio determined by the ratio of the planetary gearset 26. Thus, in the preferred embodiment, the planet carrier member 40 is rotated at a reduced speed relative to the ring gear member 38. This accomplishes the four-wheel drive low ratio feature by driving the higher numerical ratio rear drive at a higher speed than the lower numerical ratio of the front-wheel drive.

For example, if the final drive at the rear axle is 4.0 to 1, the final drive at the front axle is 3.0 to 1, and the planetary ratio is 3.0:1; that is, the ring gear member has three times the number of teeth as the sun gear member, the following drive conditions will occur. The output shaft 22 is rotated at 1200 rpm, as is the ring gear member 38. The planet carrier member 40 will rotate at a reduced ratio relative to the ring member 38 and with a 3.0:1 planetary ratio, the speed of the planet carrier member 40 will be 900 rpm. The 900 rpm driving the 3.0 front drive ratio will result in a front axle speed of 300 rpm. The ring gear speed of 1200 rpm and the rear axle ratio of 4.0 will provide a rotary speed of 300 rpm at the rear axle. Thus, the front and rear axles are driven at the same speed.

To establish a high four-wheel drive ratio, the torque-transmitting mechanism 24 is placed in the B position and the torque-transmitting mechanism 28 is engaged. Under these conditions, the planet carrier member 40 receives the input drive from the input shaft 22, the ring gear member 38 will be overdriven, that is, will rotate faster than the shaft 22. The power at the ring gear member 38 will be delivered to the rear-wheel drive mechanism and the power at the planet carrier member 40 is delivered to the front-wheel drive mechanism. Since the planet carrier member 40 is driven at engine speed, using the above theoretical output shaft 22 speed of 1200 rpm, the front wheels will be rotating at a speed of 400 rpm and the rear wheels will also be rotating at 400 rpm determined by the speed ring gear member 38, which will be 1600 rpm, and reduced by the overall drive ratio of the rear axle which is 4.0, which would make the rear axle speed 400 rpm.

By reviewing the above description of the vehicle powertrain and the operation thereof, it will now be apparent to those skilled in the art that the powertrain provided in FIGS. 1, 2, and 3 will establish a low two-wheel drive ratio at the rear wheels, a high two-wheel drive ratio at the front wheels, a low four-wheel drive ratio and a high four-wheel drive ratio.

The invention claimed is:

1. A vehicle powertrain comprising:
   a transmission output means;
   a planetary gearset including first, second, and third members, a transfer drive means drivingly connected with said first member, a first torque-transmitting mechanism selectively connecting said output means with said first and second members individually, a second torque-transmitting mechanism selectively connecting said third member with a stationary member;
   a first final drive means including said transfer drive means is continuously connected with said first member;
   a second final drive means continuously connected with said second member; and
   said torque-transmitting mechanisms being engaged individually or in combination to establish a first drive path through said first final drive, a second drive path through said second final drive, a third four-wheel drive path through both said final drives, and a fourth four-wheel drive path through both said final drives, and having a drive ratio distinct from said third four-wheel drive path.

2. The vehicle powertrain defined in claim 1, further wherein:
   said first member is a planet carrier member;
   said second member is a ring gear member;
   said third member is a sun gear member; and
   said first torque-transmitting mechanism is a two-way mechanical clutch mechanism.

3. The vehicle powertrain defined in claim 2, further wherein:
   said second torque-transmitting mechanism is a mechanical brake mechanism.

4. The vehicle powertrain defined in claim 1, further wherein:
   said first final drive mechanism has an overall drive ratio numerically less than an overdrive drive ratio of said second final drive mechanism.

5. The vehicle powertrain defined in claim 1, further wherein:
   said first torque-transmitting mechanism is connected between said output means and said first member to establish a high ratio two-wheel drive path, or between said output means and said second member to establish a low ratio two-wheel drive path.

6. The vehicle powertrain defined in claim 1, further wherein:
   said first torque-transmitting mechanism is connected between said output means and said first member, and said second torque-transmitting mechanism is connected between said third member and said stationary member to establish a high ratio four-wheel drive path, or said first torque-transmitting mechanism is connected between said second member and said output means and said second torque-transmitting mechanism is connected between said third member and said stationary member to establish a low ratio four-wheel drive path.

* * * * *